United States Patent Office 3,292,750
Patented Dec. 20, 1966

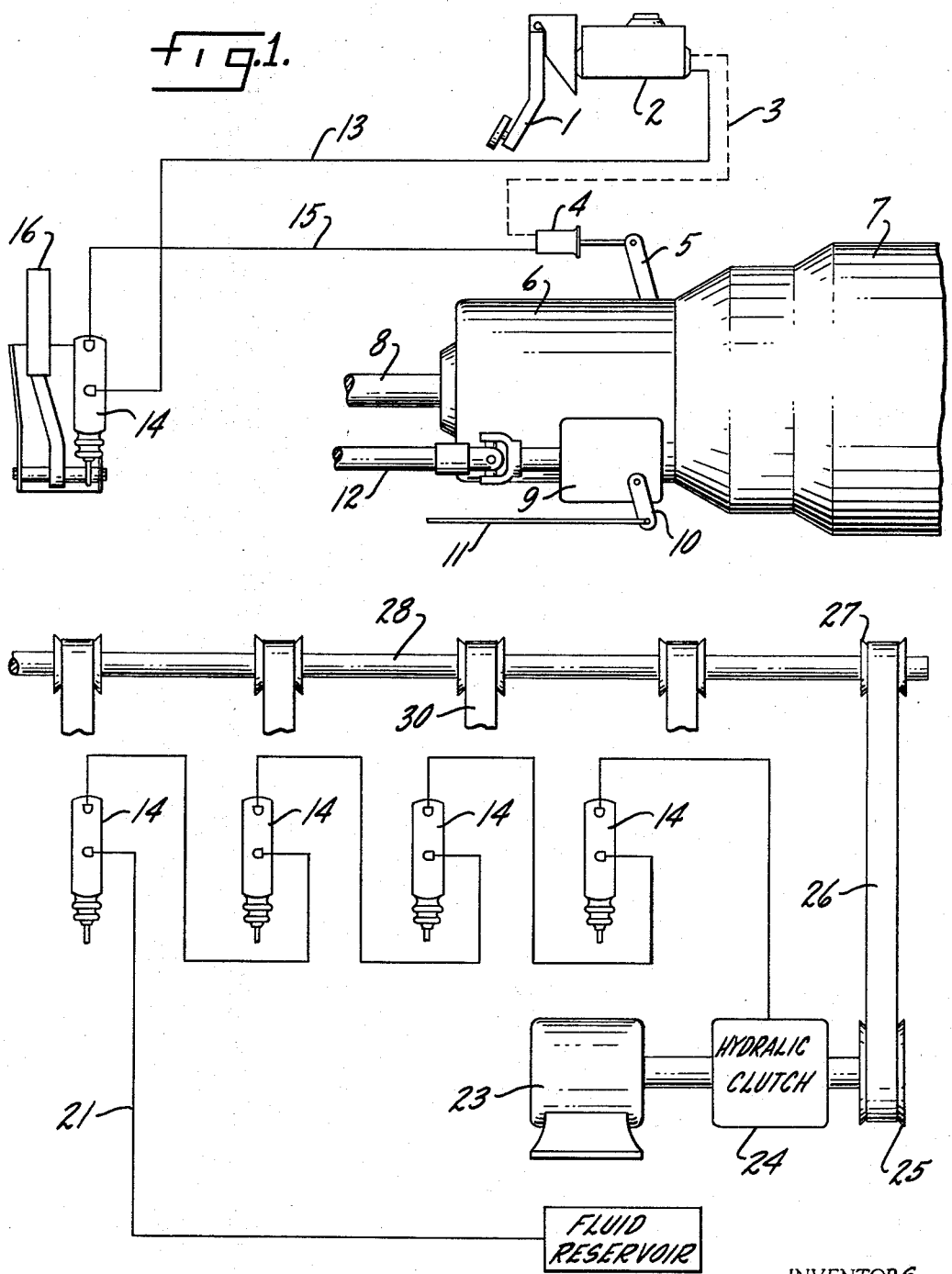

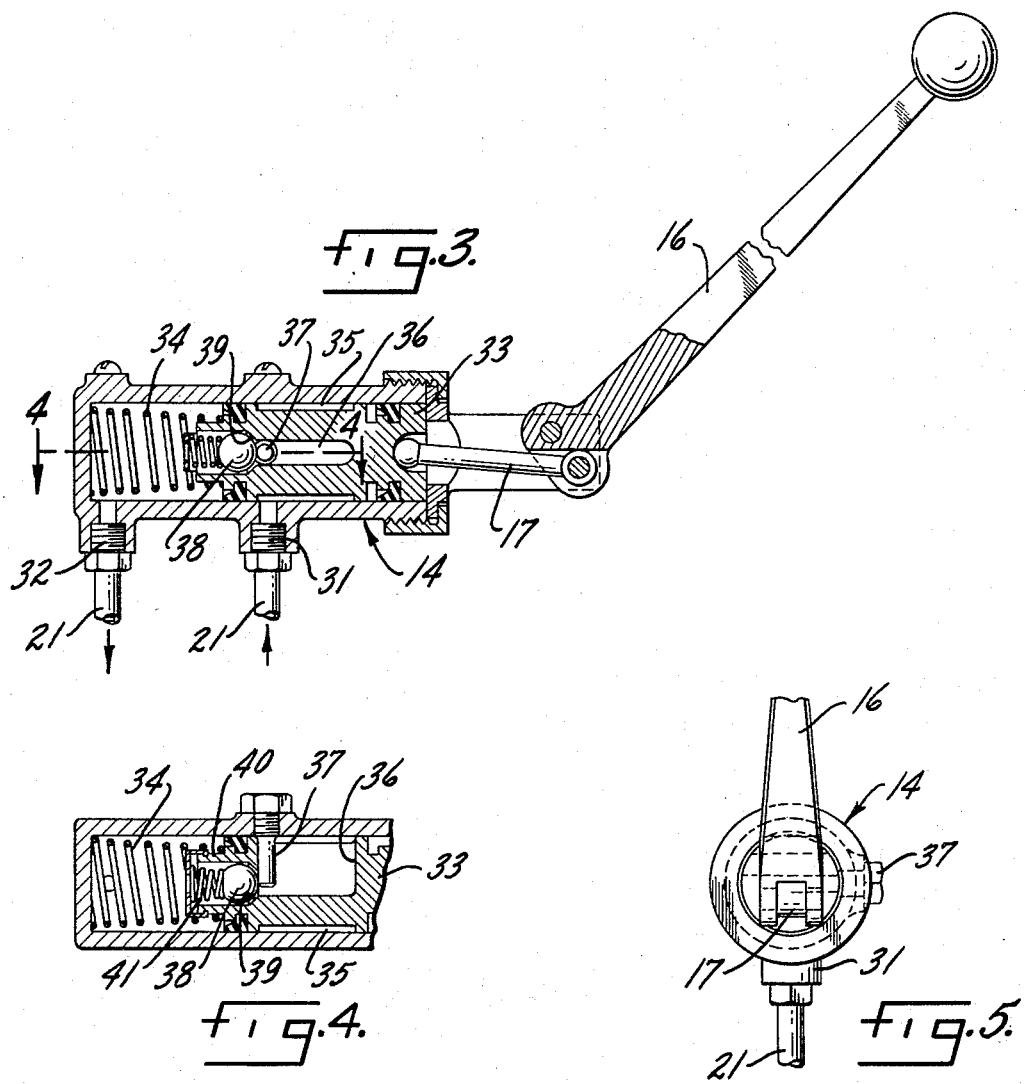

3,292,750
HYDRAULIC CLUTCH DUAL CONTROL
Henry E. Branson, Sam Salam, and Ralph O. Stromberg, Chicago, Ill., assignors to Stromberg Hydraulic Brake & Coupling Company, Chicago, Ill., a corporation of Illinois
Filed Nov. 5, 1964, Ser. No. 409,100
2 Claims. (Cl. 192—3.5)

The object of this invention is to provide a dual hydraulic control for automotive vehicles which makes it possible for the driver to drive the vehicle in the usual manner from the driver station but which makes it also possible for him to control from points removed from the driver station, power take off or other elements driven by the vehicle engine, preferably when the vehicle is at rest.

This makes it possible for the driver for example of an oil tanker to disconnect the clutch while the engine is running, leave his seat, engage the oil pump take off with the engine transmission and then from a point widely spaced from the driver's seat, control the clutch to operate the pump take off. Of course, the power take off might be used to operate other elements for example a post hole digger, or a ladder, or other similar mechanisms habitually associated with automotive vehicles.

Other objects will appear from time to time throughout the specification and claims.

The invention is illustrated more or less diagrammatically in the accompanying drawings, wherein—

FIGURE 1 is a diagrammatic illustration of the application to an automotive vehicle with parts removed;

FIGURE 2 is a diagram illustrating the application to stationary installations;

FIGURE 3 is a vertical longitudinal section through a suitable control cylinder;

FIGURE 4 is a horizontal longitudinal section along the line 4—4 of FIGURE 3;

FIGURE 5 is an end elevation of the cylinder of FIGURE 3.

Like parts are indicated by like characters throughout the specification and drawings.

Referring to FIGURE 1, the usual clutch pedal 1 of an automotive vehicle located at the driver station actuates the primary master cylinder 2. In the conventional arragement as shown in dotted lines, the hydraulic duct 3 leads from the primary master cylinder 2 to the clutch operating slave cylinder 4 and actuates through a lever 5 a clutch not shown in the vehicle transmission 6. The engine 7 associated with the transmission 6 drives through clutch, transmission and power shaft 8 in the usual manner to propel the vehicle. Associated with the transmission 6 is a power take off gear housing 9, the gears of which can be shifted in the usual manner into driving connection with the transmission 6 by the lever 10. The lever 10 may be actuated at the take off gear housing or from any other desired point through a cable 11. Drive shaft 12 leads from the take off gear housing to any desired driven apparatus.

In the present invention the duct 3 is eliminated. The duct 13 leading from the cylinder 2 to the inlet side of the auxiliary cylinder 14 and the duct 15 leading from the outlet side of the cylinder 14 to the slave cylinder 4 are substituted for duct 3.

The cylinder 14—and there may be a plurality of those cylinders in series with the slave cylinder and the master cylinder 2—is powered by a lever 16 as will hereafter appear. When the auxiliary cylinders are in the inoperative position there is an unobstructed path from master cylinder 2 through auxiliary cylinder or cylinders 14 and the ducts in series with them to the slave cylinder 4 so that pressure on the slave cylinder 4 will rotate the lever 5 to move the clutch in or out of driving position as the case may be.

The auxiliary power cylinders are identical and in series and may be driven by any desired means. Each power cylinder is associated with a station at which it may be desirable to connect or disconnect the power take off with the clutch and manipulation of any one of the auxiliary cylinders will connect or disconnect the clutch as the case may be to give the operator complete control of the operation of the particular power take off with which it is working.

Referring to the FIGURES 3, 4 and 5 showing details of the power cylinders, each cylinder has an inlet sleeve 31, an outlet sleeve 32 connected to the fluid line 21. Reciprocating in the cylinder which for convenience is open ended in a piston 33 engaged by a push rod 17. Each piston is biased by the spring 34 to the inoperative position. A clearance 35 surrounds each piston and communicates with a chamber 36 in which is a removable stop pin 37 in the inactive position shown in FIGURES 3 and 4 with the piston at the right hand end of the cylinder. The ball valve 38 engages the pin 37 to hold it off the seat 39 in the end of the cylinder. The ball valve is socketed in a sleeve 40 and may be seated by the spring 41 so that with the piston in the position shown in FIGURES 3 and 4, hydraulic pressure entering the sleeve 31 to clearance 35, chamber 36, passes by the unseated ball valve 38 and escapes through the discharge sleeve 32 into the hydraulic fluid line 21. As long as the piston is in the position shown in FIGURE 3 the cylinder in series with the other cylinders on the line has no effect on hydraulic flow but as soon as the piston is moved to the left, the ball valve is immediately seated, piston movement applies pressure on the line between the cylinder and the clutch housing.

We claim:

1. In an automotive vehicle, a power source, a propulsion transmission, a clutch interposed between them, a drivers station on the vehicle, means at the station subject to the control of the driver for manipulating the transmission and means at the station subject to the control of the driver for hydraulically actuating the clutch, a power take-off and means for selectively connecting and disconnecting the power take off and the transmission, a plurality of hydraulically actuated means at points removed from the drivers station for actuating the clutch, the hydraulic means including a hydraulic duct and manually controlled pressure cylinders all associated with said duct, each cylinder being adapted to exert pressure on the clutch independent of any one of the other cylinders.

2. The device of claim 1 characterized by the fact that the manually controlled cylinders are all in series with said duct.

References Cited by the Examiner

UNITED STATES PATENTS

| | | | |
|---|---|---|---|
| 2,323,753 | 7/1943 | Jaeger et al. | 192—3.5 X |
| 2,422,596 | 6/1947 | Stevens | 192—85 X |
| 2,656,732 | 10/1953 | Clough | 192—83 X |
| 2,747,707 | 5/1956 | Dillinger | 192—3.5 X |
| 3,076,313 | 2/1963 | Stromberg | 60—54.5 |

OTHER REFERENCES 1,083,131, June 1960, Germany.

FRED C. MATTERN, Jr., *Primary Examiner.*

BENJAMIN W. WYCHE, *Examiner.*